Feb. 20, 1968     R. V. EVANS     3,369,306
CONVEYORS
Filed March 28, 1966

INVENTOR
RAYMOND VICTOR EVANS
BY Weingarten,
Orenbuch & Lahive
ATTORNEYS

United States Patent Office 3,369,306
Patented Feb. 20, 1968

3,369,306
CONVEYORS
Raymond Victor Evans, Blackburn, England, assignor to Singer-Cobble Limited, Blackburn, England
Filed Mar. 28, 1966, Ser. No. 537,748
Claims priority, application Great Britain, Mar. 30, 1965, 13,401/65
5 Claims. (Cl. 34—162)

ABSTRACT OF THE DISCLOSURE

A flexible conveyor is formed by closely spaced parallel wires suspended between two endless chains of pivoted links. Each chain runs in a guide and the spacing between the guides is adjustable to maintain the wires taut. Uniform tension on the wires is maintained by having one of the guides laterally movable and controlling the spacing between the guides by applying a relatively constant force to the movable guide.

---

The invention relates to conveyors and has more particular reference to conveyors having an openwork support surface thereto.

It is the primary object of the present invention to provide a conveyor of such character as will allow of the free application of a treatment media to material supported on and by the conveyor with the minimum of marking of such material.

According to the present invention a flexible conveyor is characterised in that the support surface thereof includes a multiplicity of spaced parallel wires or wire structures extending between opposed retention members, said members being mounted for movement relative to appropriate guide means and the said wires or wire structures being under tension.

In the preferred embodiment the conveyor comprises two spaced endless structures arranged in vertical disposition, and a plurality of spaced parallel support elements extending between the said structures, the structures being adapted to retain the support elements as applied thereto and each such support element comprising a wire or a plurality thereof. Each said endless structure is located in and guided by guide means, the said means being adjustable transversely of the conveyor thereby to allow of the tensioning of the support elements, and means are provided for applying a force to the guide means to maintain the support elements taut.

The invention will now be described further, by way of example only, with reference to the accompanying diagrammatic drawings illustrating one embodiment thereof and in which.

Figure 1:
FIG. 1 is a diagrammatic side elevation of a double conveyor according to the invention.

Referring now to the drawings, and particularly to FIG. 1 thereof, a conveyor assembly 11 comprises two similar endless conveyors 11a disposed in spaced apart relationship one above the other so as to define a passage 12 of predetermined dimensions herebetween, and each having pressure or suction boxes 13 therein for passing hot air or other treatment media through the material 14 via the perforate sheet defined by the lower and upper runs respectively of the conveyors.

Each conveyor 11a consists of two spaced parallel chains 15 supported on and progressed by sprocket wheels 16, and a plurality of closely adjacent parallel wires 17 extending between the chains.

Figure 2:
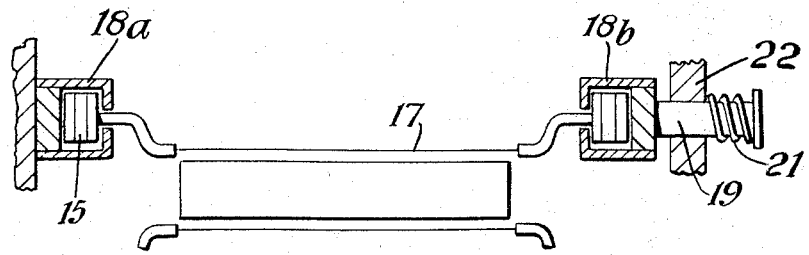
FIG. 2 is a section corresponding to line II—II of FIG. 1.

The chains 15 move in guides 18a, 18b (see FIG. 2), arranged at each side of the machine, one such guide 18a being fixed and the other 18b being adjustable transversely of the conveyor thereby to apply a tension to the individual wires 17 and/or to compensate for temperature variations. The adjustable guide 18b is positionally controlled by means of a spring 21 compressed between the enlarged end of piston 19 and the rigid plate 22. The compression spring exerts a relatively constant force upon the adjustable guide 18b, through the piston 19, and thereby maintains the wires 17 taut despite variations in ambient temperature. It is, of course, apparent that the force could be exerted by hydraulic or pneumatic apparatus in place of the illustrated compression spring.

The corresponding sprocket wheels for each end of the conveyor are mounted on a common shaft.

Figure 3:
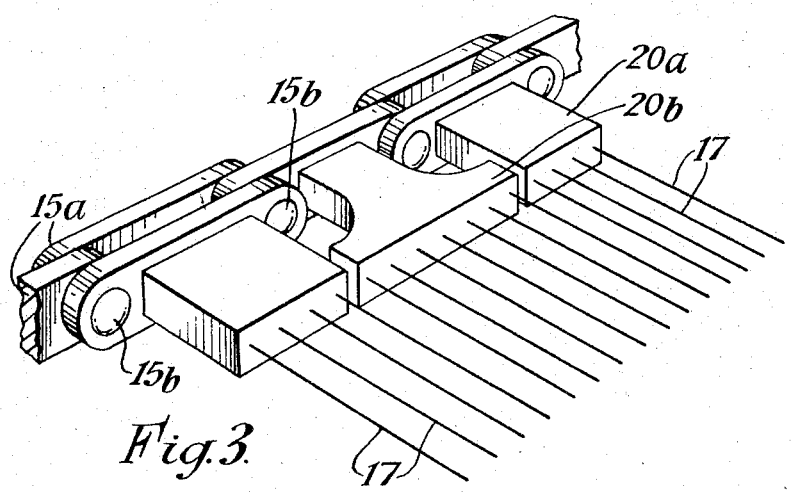
FIG. 3 is a perspective view of a typical conveyor section.

Referring now to FIG. 3, it will be seen that each chain link 15a has a bracket 20a, 20b extending therefrom, the said brackets being directed inwardly and transversely of the conveyor and being arranged to receive and retain the ends of the wires 17 therein. The brackets 20a, 20b may be cranked (as in FIG. 2) or straight (as in FIG. 3), the cranked brackets being provided so as to allow of a closer location of the supporting surfaces of the conveyors, the necessity of providing brackets of this form depending upon the minimum required separation, and the successive brackets are so arranged as to give a continuous sheet of equally or substantially equally spaced wires. In the embodiment illustrated, alternate brackets 20a are generally rectangular, the intermediate brackets 20b being divergent towards their extremities. The adjacent wires on successive brackets 20a, 20b will be so spaced as to give a constant wire pitch both at the chain joints 15b and along the length of each link 15a, the pitch being of the order of ⅛" and the wire being 30's S.W.G.

The arrangements as illustrated in FIG. 1 will also include means (not shown) for adjusting the vertical separation of the two conveyors.

In use in supporting and holding down a spongy type of material while maintaining its thickness to a very accurate dimension, the two conveyors 11a are arranged at a desired separation and the material 14 under processing is passsed therealong. By virtue of the fixed separation of the conveyors the thickness of the material passing therealong will be established and maintained, while the nature of the conveyor surface will allow hot air or other treatment media to reach the material without such material being marked by the conveyor and without the formation of hot or cold spots.

The invention is not restricted to the exact features of the embodiment hereinbefore described since alternatives will readily present themselves to one skilled in the art, since in some circumstances it may be found desirable to utilize one conveyor only, rather than the co-operating conveyors before referred to. It may also be found desirable to replace the single wires by wire mesh slats, the mesh being such as to allow of a ready access to material being supported by drying air or other treatment media.

What I claim is:
1. A flexible conveyor comprising
(a) two chains, each chain being formed of pivoted links,
(b) a pair of spaced guides, each chain being disposed in its own guide,
(c) closely spaced parallel wires suspended between the two chains of pivoted links, each opposed link having secured to it a plurality of wires,

(d) the guides being arranged to permit the wires and the chains to move therealong;

(e) at least one of the guides being laterally movable to permit the spacing between the guides to be altered to place the wires under tension; and (f) means applying a force to the movable guide to maintain the wires taut.

2. A flexible conveyor according to claim 1, further including (g) a bracket secured to each opposed link, the bracket receiving the ends of a plurality of wires.

3. A flexible conveyor according to claim 1, wherein each of the chains forms an endless loop, and further including, sprocket wheels engaging the chains and means for causing the sprocket wheels to revolve to cause the chains to move.

4. The invention according to claim 1 further including a second similar flexible conveyor disposed over and spaced from the first flexible conveyor, the wires of the conveyors defining a passageway therebetween through which material to be conveyed passes.

5. The invention according to claim 4, further including means for applying heated air to the material being conveyed through the passageway.

References Cited
UNITED STATES PATENTS

| | | | |
|---|---|---|---|
| 3,161,155 | 12/1964 | Orlandi | 198—194 XR |
| 835,843 | 11/1906 | Baetz | 34—162 |
| 1,676,481 | 7/1928 | Grummey et al. | 198—195 |
| 2,731,160 | 1/1956 | Maier | 198—208 |
| 2,838,420 | 6/1958 | Valente. | |
| 3,197,030 | 7/1965 | Black | 198—194 |

FOREIGN PATENTS 748    2/1881    Great Britain.

JAMES W. WESTHAVER, *Primary Examiner.*

A. D. HERRMANN, *Assistant Examiner.*